(12) United States Patent
Hong et al.

(10) Patent No.: US 10,139,214 B2
(45) Date of Patent: Nov. 27, 2018

(54) APPARATUS FOR ACQUIRING LOCATION COORDINATES OF OBJECT USING TWO MEASUREMENT HEADS AND METHOD USING THE SAME

(71) Applicant: ELECTRONICS AND TELECOMMUNICATIONS RESEARCH INSTITUTE, Daejeon (KR)

(72) Inventors: Hyo-Bong Hong, Daejeon (KR); Seung-Min Choi, Daejeon (KR); Chang-Beom Kim, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 224 days.

(21) Appl. No.: 15/183,639

(22) Filed: Jun. 15, 2016

(65) Prior Publication Data

US 2017/0067730 A1 Mar. 9, 2017

(30) Foreign Application Priority Data

Sep. 7, 2015 (KR) .................. 10-2015-0126519
Mar. 3, 2016 (KR) .................. 10-2016-0025560

(51) Int. Cl.
*G01B 7/004* (2006.01)

(52) U.S. Cl.
CPC .................. *G01B 7/004* (2013.01)

(58) Field of Classification Search
CPC ..................................... G01B 7/004
See application file for complete search history.

(56) References Cited

U.S. PATENT DOCUMENTS

| 5,530,347 A * | 6/1996 | Heerwegh | G06F 3/046 |
| | | | 178/18.07 |
| 2010/0155604 A1 | 6/2010 | Lim et al. | |
| 2012/0126119 A1* | 5/2012 | Fukaya | G01B 15/04 |
| | | | 250/310 |
| 2012/0176126 A1* | 7/2012 | Naganuma | G01R 33/0011 |
| | | | 324/207.25 |

(Continued)

FOREIGN PATENT DOCUMENTS

| KR | 10-2007-0096370 A | 10/2007 |
| KR | 10-2008-0099940 A | 11/2008 |

(Continued)

*Primary Examiner* — John Breene
*Assistant Examiner* — Mohammad Islam

(57) ABSTRACT

Disclosed herein are an apparatus for acquiring the location coordinates of an object to be measured using two measurement heads and a method using the apparatus. The apparatus for acquiring the location coordinates of an object includes two measurement heads for individually detecting a signal corresponding to the object to be measured, a measurement head fixing unit for placing the two measurement heads so as to face each other with the object therebetween, a rotatable structure for rotating the measurement head fixing unit, and a location determination unit for acquiring the location coordinates of the object to be measured based on the strengths of the two detection signals detected by the measurement heads.

12 Claims, 9 Drawing Sheets

(56) References Cited

U.S. PATENT DOCUMENTS

| | | | |
|---|---|---|---|
| 2014/0097829 A1* | 4/2014 | Wang | G01R 33/1269 |
| | | | 324/204 |
| 2014/0156220 A1* | 6/2014 | Okamoto | G01R 33/072 |
| | | | 702/150 |
| 2014/0316738 A1 | 10/2014 | Kim et al. | |
| 2015/0022192 A1* | 1/2015 | Ausserlechner | G01D 5/145 |
| | | | 324/207.25 |
| 2015/0028859 A1* | 1/2015 | May | G01D 5/145 |
| | | | 324/207.15 |
| 2015/0331075 A1* | 11/2015 | Yamamoto | A61B 5/055 |
| | | | 324/309 |
| 2016/0123772 A1* | 5/2016 | Sugino | G01D 5/20 |
| | | | 324/207.21 |
| 2017/0115364 A1* | 4/2017 | Efrat | G01R 33/10 |

FOREIGN PATENT DOCUMENTS

| | | |
|---|---|---|
| KR | 10-2009-0060143 A | 6/2009 |
| KR | 10-2013-0106127 A | 9/2013 |
| WO | WO 2007/108580 A1 | 9/2007 |

* cited by examiner

APPARATUS FOR ACQUIRING LOCATION COORDINATES OF OBJECT USING TWO MEASUREMENT HEADS AND METHOD USING THE SAME

CROSS REFERENCE TO RELATED APPLICATIONS

This application claims the benefit of Korean Patent Application No. 10-2015-0126519, filed Sep. 7, 2015, and No. 10-2016-0025560, filed Mar. 3, 2016, which are hereby incorporated by reference in its entirety into this application.

BACKGROUND OF THE INVENTION

1. Technical Field

The present invention relates generally to technology for acquiring 2-dimensional location coordinates of an object. More particularly, the present invention relates to an apparatus for acquiring location coordinates of an object using two measurement heads and a method using the apparatus, which may acquire the Cartesian coordinates of an object based on the intensities of signals detected by two measurement heads.

2. Description of the Related Art

To acquire the location of a specific object in 2-dimensional or 3-dimensional space using electromagnetic waves or sound has been considered important in developing various technological fields and is widely being used in various application fields. For example, radar was developed originally for military purposes in the 1930s, but now is being used in various fields, such as weather observation, control of civilian aircraft, and exploration of the surface of the earth. Also, in a broad sense, MRI, CT, PET, ultrasound apparatus, etc. have been developed based on technology in which the 2-dimensional or 3-dimensional location of an object is acquired using reflection and absorption of electromagnetic waves.

However, these applications do not all apply the same technique in order to acquire location information or images using the location information. For example, X-ray CT scanning based on X-rays uses radiation as a signal for acquiring an image and creates a 3-dimensional image based on a 2-dimensional tomogram using the Radon transform, introduced by the Austrian mathematician Radon, as a mathematical algorithm for converting the signal into an image or location information. However, in the case of MRI, because an image may be created in different directions, unlike imaging using X-rays, which have a fixed direction, the mathematical principle used for MRI is very different from that used for X-ray CT scanning.

Consequently, depending on the amount or type of information that is needed, it is necessary to vary the characteristics of equipment, the location of an object, and principles and devices used for imaging, and various kinds of measurement devices and signal and image processing algorithms are being developed in order to acquire more efficient information.

Currently, MRI, CT, and PET, which are most commonly used, are used not only in medical fields but also in various other application fields and enable the acquisition of high-resolution images having a high degree of precision that was inconceivable when they were developed. However, the development of such equipment necessarily increases operational costs and the price of devices. Therefore, the development of a simple device that may be operated at low cost is still required.

[Documents of Related Art]
(Patent Document 1) Korean Patent Application Publication No. 10-2009-0060143, disclosed on Jun. 11, 2009 and titled "Quantitative detection method of biomolecules using magnetic nanoparticle and frequency mixing magnetic reader".

SUMMARY OF THE INVENTION

An object of the present invention is to quickly acquire 2-dimensional coordinates of an object to be measured at low cost.

Another object of the present invention is to detect the location of an object in 2-dimensional space only through the movement of measurement heads.

A further object of the present invention is to provide technology that may be widely used for devices from small display equipment to devices that require wide area information, such as radar, by acquiring the location of an object using only a difference in signal strength depending on distance.

In order to accomplish the above object, an apparatus for acquiring location coordinates of an object to be measured using two measurement heads according to the present invention includes two measurement heads for individually detecting a signal corresponding to the object to be measured; a measurement head fixing unit for placing the two measurement heads so as to face each other with the object to be measured therebetween; a rotatable structure for rotating the measurement head fixing unit; and a location determination unit for acquiring the location coordinates of the object to be measured based on strengths of two detection signals detected by the measurement heads.

The location determination unit may calculate a radius corresponding to polar coordinates of the object to be measured based on a circle generated by the rotation, and may acquire the location coordinates by converting the polar coordinates into Cartesian coordinates based on the radius corresponding to the polar coordinates and an angle by which the measurement head fixing unit rotates.

The location determination unit may calculate a first distance, which is a length between the object to be measured and a first measurement head, and a second distance, which is a length between the object to be measured and a second measurement head, the first measurement head and the second measurement head being selected from among the measurement heads, and may calculate the radius corresponding to the polar coordinates by subtracting the radius of the circle from a longer distance among the first distance and the second distance.

The location determination unit may calculate the first distance and the second distance using at least one of a strength of a first detection signal detected by the first measurement head, a strength of a second detection signal detected by the second measurement head, and a proportional constant according to a kind of the signal.

The location determination unit may acquire the location coordinates to correspond to the detection signals detected while the measurement heads rotate counterclockwise 180 degrees.

The two measurement heads may include a single excitation solenoid coil for generating a magnetic field based on a combined signal in which a high-frequency sinusoidal signal is combined with a low-frequency sinusoidal signal in order to detect a nonlinear magnetic particle.

The magnetic field may correspond to an addition of a first magnetic field, which is generated to correspond to the high-frequency sinusoidal signal, and a second magnetic field, which is generated to correspond to the low-frequency sinusoidal signal.

The combined signal may be generated by combining the high-frequency sinusoidal signal with the low-frequency sinusoidal signal using a combiner in which two signals are combined by being added.

Also, a method for acquiring location coordinates of an object to be measured using two measurement heads according to an embodiment of the present invention includes fixing two measurement heads, which individually detect a signal corresponding to an object to be measured, using a measurement head fixing unit such that the two measurement heads face each other with the object to be measured therebetween; rotating the measurement head fixing unit; and acquiring the location coordinates of the object to be measured based on strengths of two detection signals detected by the measurement heads.

Acquiring the location coordinates may include calculating a radius corresponding to polar coordinates of the object to be measured based on a circle generated by the rotation; and converting the polar coordinates into Cartesian coordinates based on the radius corresponding to the polar coordinates and an angle by which the measurement head fixing unit rotates.

Calculating the radius may be configured to calculate a first distance, which is a length between the object to be measured and a first measurement head, and a second distance, which is a length between the object to be measured and a second measurement head, the first measurement head and the second measurement head being selected from among the measurement heads, and to calculate the radius corresponding to the polar coordinates by subtracting the radius of the circle from a longer distance among the first distance and the second distance.

Calculating the radius may be configured to calculate the first distance and the second distance using at least one of a strength of a first detection signal detected by the first measurement head, a strength of a second detection signal detected by the second measurement head, and a proportional constant according to a kind of the signal.

Acquiring the location coordinates may be configured to acquire the location coordinates to correspond to the detection signals detected while the measurement heads rotate counterclockwise 180 degrees.

The two measurement heads may include a single excitation solenoid coil for generating a magnetic field based on a combined signal in which a high-frequency sinusoidal signal is combined with a low-frequency sinusoidal signal in order to detect a nonlinear magnetic particle.

The magnetic field may correspond to an addition of a first magnetic field, which is generated to correspond to the high-frequency sinusoidal signal, and a second magnetic field, which is generated to correspond to the low-frequency sinusoidal signal.

The combined signal may be generated by combining the high-frequency sinusoidal signal with the low-frequency sinusoidal signal using a combiner in which two signals are combined by being added.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
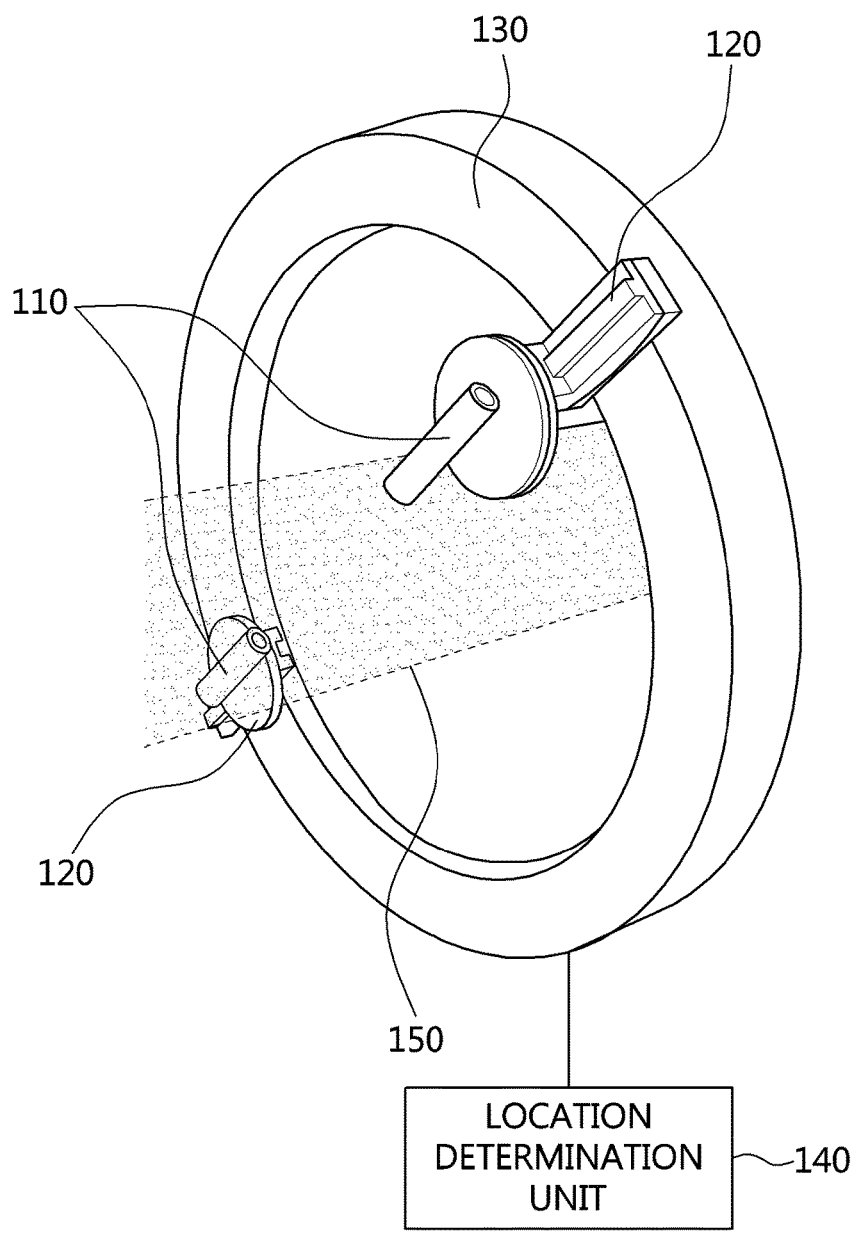
FIG. 1 is a view illustrating an apparatus for acquiring location coordinates of an object to be measured using two measurement heads according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view illustrating an apparatus for acquiring location coordinates of an object to be measured using two measurement heads according to an embodiment of the present invention.

Referring to FIG. 1, the apparatus for acquiring location coordinates of an object to be measured using two measurement heads according to an embodiment of the present invention includes two measurement heads 110, two measurement head fixing units 120 for fixing the two measurement heads, a rotatable structure 130, and a location determination unit 140.

Here, as shown in FIG. 1, the two measurement heads 110 may be fixed to the rotatable structure 130 using the two measurement head fixing units 120.

Here, the two measurement heads 110 may be fixed to the rotatable structure 130 such that the two measurement heads face each other.

Also, each of the two measurement heads 110 may include a signal excitation module and a signal detection module.

Here, the location of the two measurement heads 110 may be adjusted using the two measurement head fixing units 120 such that the signal excitation module and the signal detection module are parallel to a straight line on which the two measurement heads 110 are located. For example, the locations of the two measurement heads 110 may be precisely controlled using tools such as a micrometer or the like.

Here, the rotatable structure 130 to which the two measurement head fixing units 120 are fixed rotates, whereby the two measurement heads 110 may rotate with an object motion path 150 therebetween.

When a measurement is made, each of the two measurement heads 110 may continuously rotate and simultaneously generate and detect signals while the object to be measured moves along the object motion path 150. Here, because the signal excitation module and the signal detection module are located together, the apparatus for measuring the location coordinates of an object may be simplified.

Here, the location determination unit 140 acquires two detection signals detected by the two measurement heads 110, and may then acquire the location coordinates of the object based on the strengths of the two detection signals.

For example, the two measurement heads 110 may generate magnetic fields having the same strength, and may thus induce excitation signals on the object. Here, if the object to be measured is located at the center of the two measurement heads 110, the excitation signals induced by the two measurement heads 110 have the same strength, but if not, the strengths of the excitation signals induced by the two measurement heads 110 may differ from each other. In this case, because the strengths of the signals emitted from the object may also differ from each other, the location coordinates of the object may be acquired by measuring the difference in the signal strengths.

Here, a radius corresponding to the polar coordinates of the object is calculated based on a circle generated by the rotation of the measurement head fixing units 120, and the polar coordinates are converted into Cartesian coordinates based on the radius corresponding to the polar coordinates and the angle through which the measurement head fixing units rotate, whereby the location coordinates may be acquired.

For example, if the radius corresponding to the polar coordinates is r and the angle through which the measurement head fixing units rotate is θ, the location coordinates (x, y), when converted into Cartesian coordinates, may be (r*cos θ, r*sin θ).

Here, a first distance, which is a length between the object to be measured and a first measurement head, selected from among the two measurement heads 110, and a second distance, which is a length between the object to be measured and a second measurement head, selected from among the two measurement heads 110, are respectively measured, and the radius corresponding to the polar coordinates may be calculated by subtracting the radius of the circle from the a longer distance among the first distance and the second distance.

For example, if the radius of the circle generated by the rotation of the measurement head fixing units 120 is 7 cm, the first distance is 10 cm, and the second distance is 4 cm, the radius corresponding to the polar coordinates may be 3 cm, which is calculated by subtracting 7 cm, which is the radius of the circle, from 10 cm.

Here, the first distance and the second distance may be calculated using at least one of the strength of a first detection signal detected by the first measurement head, the strength of a second detection signal detected by the second measurement head, and a proportional constant according to the type of the signal.

For example, if the first measurement head is MH1, the second measurement head is MH2, the first distance is $r_1$, the second distance is $r_2$, the strength of the excitation signals induced by the two measurement heads 110 is S, and the proportional constant is k, the strength of the first detection signal $H_{MH1}$ and the strength of the second detection signal $H_{MH2}$ may be calculated as the following Equation (1):

$$H_{MH1} = k \frac{S}{r_1^2} \qquad (1)$$

$$H_{MH2} = k \frac{S}{r_2^2}$$

Here, the diameter 2R of the circle, which is generated by the rotation of the measurement head fixing units 120, may be $r_1 + r_2$. Therefore, using Equation (1) and the diameter of the circle generated by the rotation of the measurement head fixing units 120, the first distance may be calculated as the following Equation (2):

$$r_1 = \frac{2R}{1 + \sqrt{\frac{H_{MH2}}{H_{MH1}}}} 2R \qquad (2)$$

Also, the second distance may be calculated by subtracting the first distance from the diameter 2R of the circle, which is generated by the rotation of the measurement head fixing units 120.

Here, the location coordinates may be acquired so as to correspond to the detection signals, which are detected while the two measurement heads 110 rotate counterclockwise through 180 degrees. Specifically, when the first measurement head and the second measurement head respectively start from the top and bottom of the circle and rotate through 180 degrees, a circle may be generated as if they rotated through 360 degrees. That is, a circle may be generated by the rotation of the measurement head fixing units 120, and location coordinates of every part of the object located inside the circle may be acquired.

Here, in order to detect a nonlinear magnetic particle, the two measurement heads 110 may include a single excitation solenoid coil for generating a magnetic field based on a combined signal, in which a high-frequency sinusoidal signal is combined with a low-frequency sinusoidal signal.

Here, the magnetic field may be the sum of a first magnetic field, which is generated to correspond to the high-frequency sinusoidal signal, and a second magnetic field, which is generated to correspond to the low-frequency sinusoidal signal. In other words, because the combined signal is applied to a single excitation solenoid coil, a magnetic field that seems as if it were generated using two excitation solenoid coils may be acquired.

Here, the combined signal may be generated by adding the high-frequency sinusoidal signal and the low-frequency sinusoidal signal using a combiner.

Here, the combiner may be a passive electronic element, which produces a signal that is a composite of two signals by adding them. That is, as the two signals are simply added, they may be combined without interfering with each other.

Here, the combiner may be one of a Radio Frequency (RF) combiner and a summing amplifier, which correspond to the characteristics of the combined signal.

Here, the RF combiner is one kind of passive circuit, and may be a circuit for combining power of different signals or splitting power of signal equally or unevenly. Here, the RF combiner may combine two signals by performing signal addition, unlike a mixer, which mixes two signals having different frequencies and outputs a signal at a frequency equal to the difference between the two signals.

Here, the summing amplifier may be a circuit for performing only an addition operation, among the operations of an existing operational amplifier, which may perform addition, subtraction, or differentiation and integration of multiple signals.

In this case, whether to use the RF combiner or the summing amplifier as the combiner according to the present invention may be determined by a user or an administrator, who implements the present invention.

Also, the two measurement heads 110 amplify the strength of the high-frequency sinusoidal signal and the strength of the low-frequency sinusoidal signal respectively using a first amplifier and a second amplifier and input the two signals to the combiner. Then, the strength of the signal output from the combiner is amplified using a third amplifier, whereby a combined signal may be generated.

Here, the first amplifier and the second amplifier may respectively amplify the high-frequency sinusoidal signal and the low-frequency sinusoidal signal by regulating the strength thereof depending on the characteristics of the combined signal. That is, because the two signals are amplified differently by varying the strength thereof, it is possible to realize an effect that can be acquired when two excitation solenoid coils are used and the characteristic of an input signal is controlled by adjusting the ratio of the number of turns of each of the two excitation solenoid coils and the geometrical location of the two coils.

Also, the third amplifier may regulate the strength of the signal in order to compensate for loss that occurs when the two signals are combined through the combiner, which is a passive electronic element. That is, the strength of the combined signal output from the combiner may be amplified so as to compensate for the strength that is lost in the combiner.

Here, the frequency domain of the signal emitted from the object is analyzed, and if a harmonic peak is found, it may be determined that a nonlinear magnetic particle exists on the object to be measured.

Here, the harmonic peak corresponds to a peak of a certain frequency, and may be found when a nonlinear magnetic particle exists on the object to be measured. Here, the characteristic of the corresponding particle may be understood based on the harmonic peak found in the frequency domain.

Here, if transformation of the signal at the sum of two frequencies is detected in the frequency domain, whether a harmonic peak is found may be checked. That is, if a nonlinear magnetic particle exists on the object, the signal emitted from the object may be detected as not being proportional to the signal at the sum of the two frequencies.

Therefore, if the signal is not proportional to the signal at the sum of the two frequencies but a transformed signal is detected, a nonlinear magnetic particle is expected to exist on the object, and thus the process of detecting the harmonic peak may be performed.

As described above, the 2-dimensional coordinates of an object to be measured may be acquired quickly at low cost using the apparatus for acquiring the location coordinates of an object to be measured.

Also, the location of an object in 2-dimensional space may be detected using only the movement of the measurement heads, and the location of the object may be acquired through the difference in the signal strengths depending on the distance. Therefore, technology that can be widely used for devices, ranging from small display equipment to devices that require wide area information, such as radar, may be provided.

Figure 2:
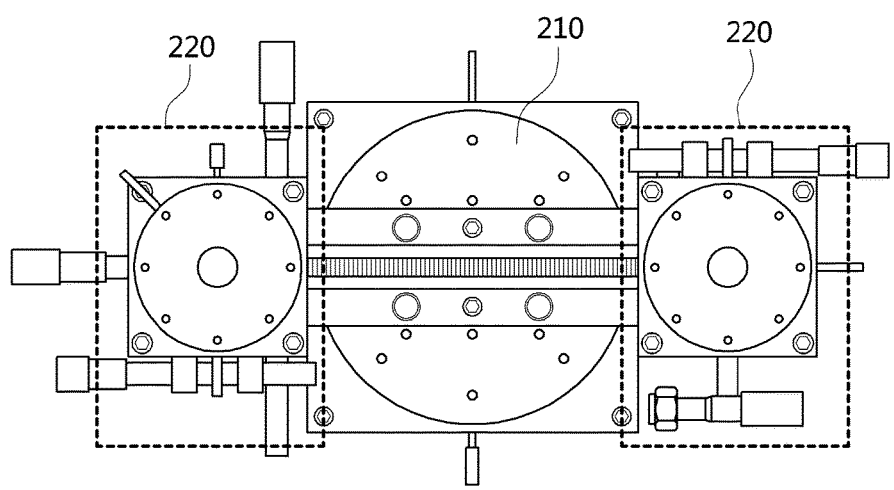
FIG. 2 is a view illustrating an example of a rotatable structure and a measurement head fixing unit in the apparatus for acquiring location coordinates according to the present invention.

FIG. 2 is a view illustrating an example of a rotatable structure and a measurement head fixing unit in an apparatus for acquiring location coordinates according to the present invention.

Referring to FIG. 2, the apparatus for acquiring location coordinates may include two measurement head fixing units 220 for controlling the location of two measurement heads and a rotatable structure 210 for rotating the two measurement head fixing units.

FIG. 2 illustrates an example in which the apparatus for acquiring location coordinates, illustrated in FIG. 1, is embodied for research purposes, and signal processing may be performed using two measurement heads respectively installed in the two measurement head fixing units 220.

Here, the two measurement head fixing units 220, illustrated in FIG. 2, may control the locations of the two measurement heads such that a signal excitation module and a signal detection module included in the two measurement heads are parallel to the straight line on which the two measurement heads are located. For example, the locations of the two measurement heads may be precisely controlled using tools such as a micrometer or the like.

Here, the rotatable structure 210 may have the shape illustrated in FIG. 2, or may have a ring shape corresponding to a gantry structure, as shown FIG. 1. That is, as long as the structure enables processing of signals in the two measurement heads fixed to the two measurement head fixing units 220, it does not matter which of the rotatable structure of FIG. 1 and the rotatable structure of FIG. 2 is used.

FIGS. 3 to 7 are views illustrating the process of acquiring location coordinates according to an embodiment of the present invention.

Referring to FIGS. 3 to 7, first, the two measurement heads 310 and 311 may induce excitation signals on the object 350 to be measured or detect signals from the object 350 while they are rotating along a radius of rotation 340.

Here, each of the measurement heads 310 and 311 may include a signal excitation module 320 or 321 for inducing excitation signals on the object 350 and a signal detection module 330 or 331 for detecting signals emitted from the object 350. Accordingly, each of the measurement heads 310 and 311 may perform both the excitation and detection of signals, whereby the apparatus for acquiring the location coordinates of the object to be measured may be simplified and the production cost for the apparatus may be reduced.

Figure 3:
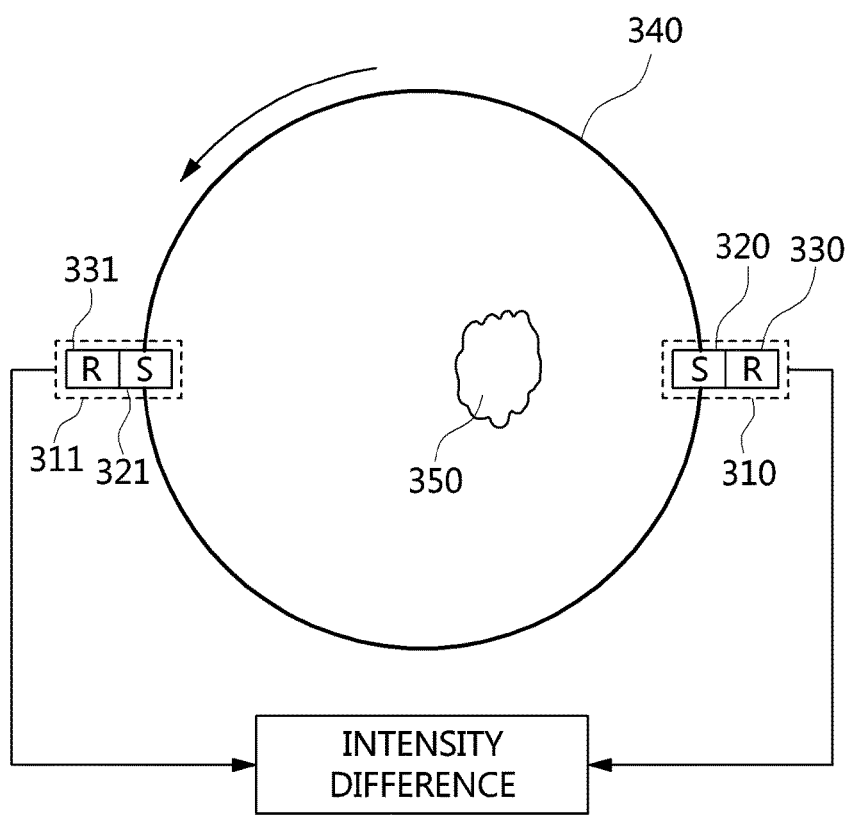
FIGS. 3 to 7 are views illustrating the process of acquiring location coordinates according to an embodiment of the present invention.
Figure 4:
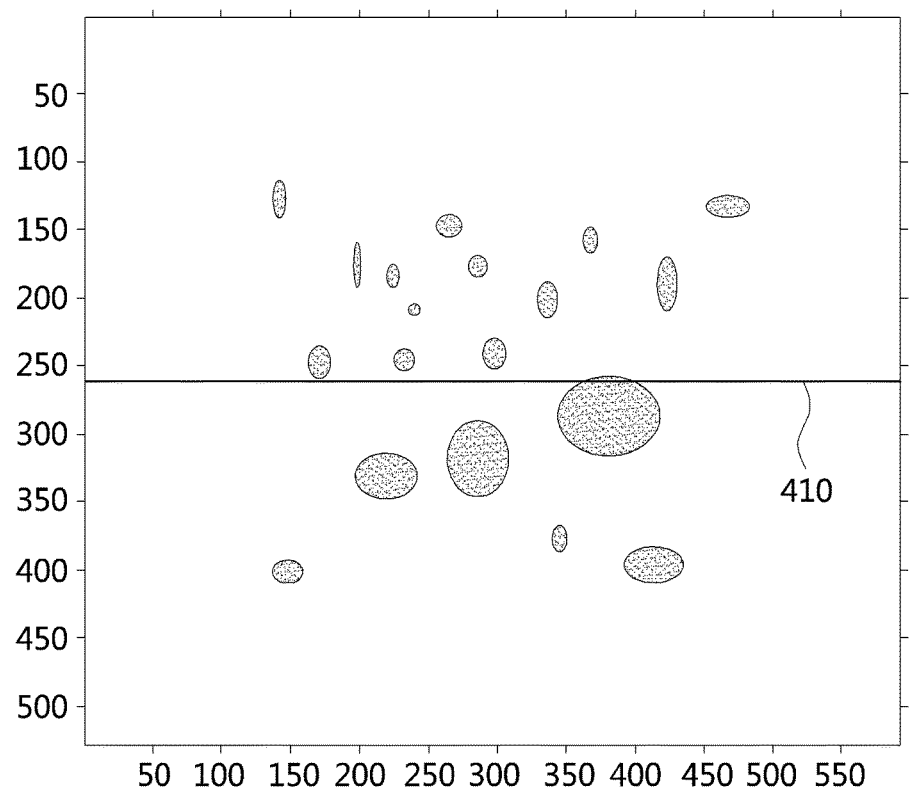
Figure 5:
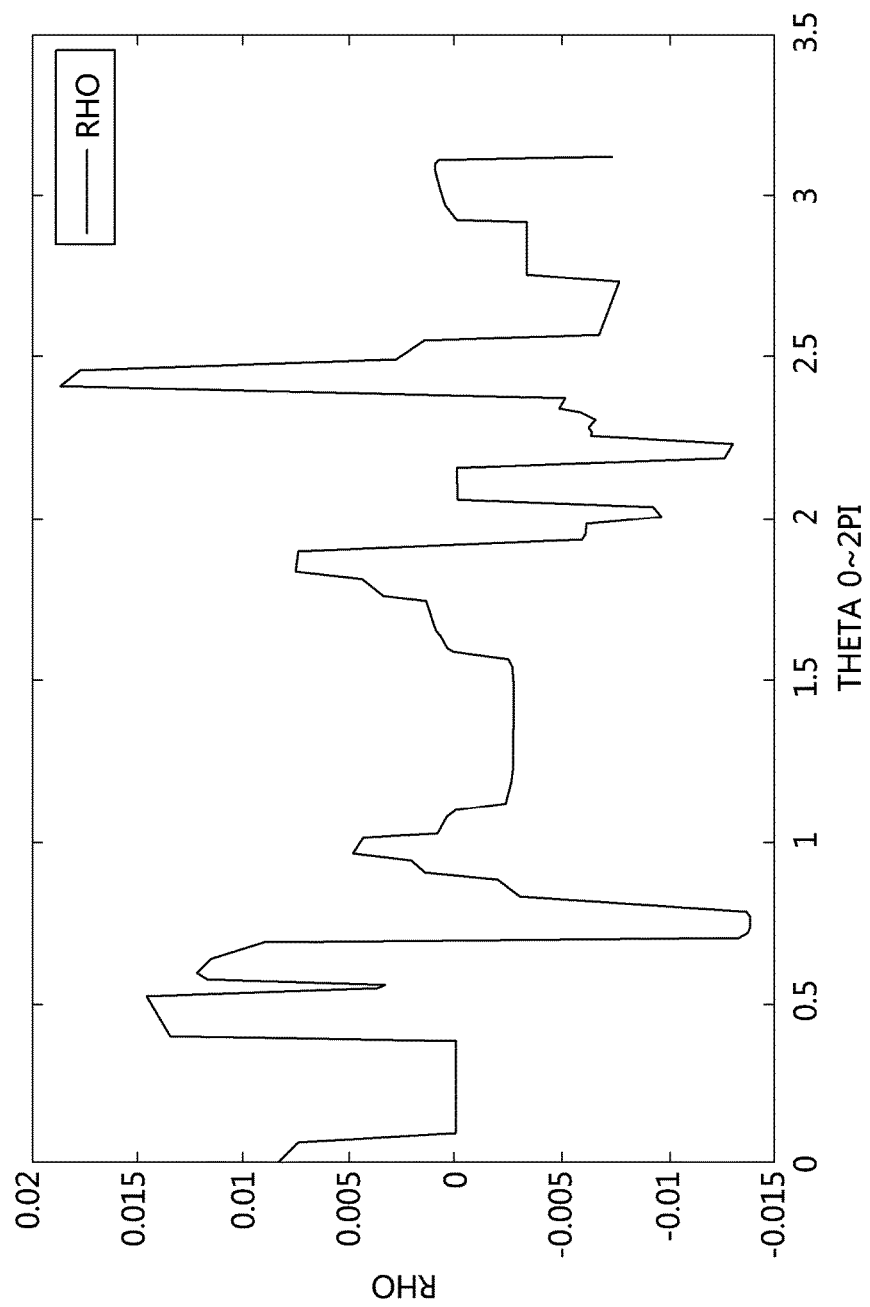

Also, an operation is performed for the original tomogram image illustrated in FIG. 4 using the apparatus for acquiring the location coordinates, which operates as shown in FIG. 3, and thus a graph with rho ($\rho$) and theta ($\theta$) may be generated as shown in FIG. 5. For example, when an operation is performed for the X-axis 410 on the image illustrated in FIG. 4, the result may correspond to about 0.008, which is the value when theta is 0 in FIG. 5.

Then, the graph shown in FIG. 5 may be generated by rotating the X-axis 410 of FIG. 4 counterclockwise and calculating rho as a function of theta. That is, when theta rotates 360 degrees so as to correspond to from 0 to $2\pi$, the value of rho as a function of the value of theta may be represented on the graph.

Here, the graph illustrated in FIG. 5 may be a graph for a polar coordinate system in which a location in the plane may be represented using an angle and a distance. Therefore, the location coordinates for indicating the location of the object may be acquired by converting the graph illustrated in FIG. 5 into the orthogonal coordinate system illustrated in FIG. 7.

Figure 6:
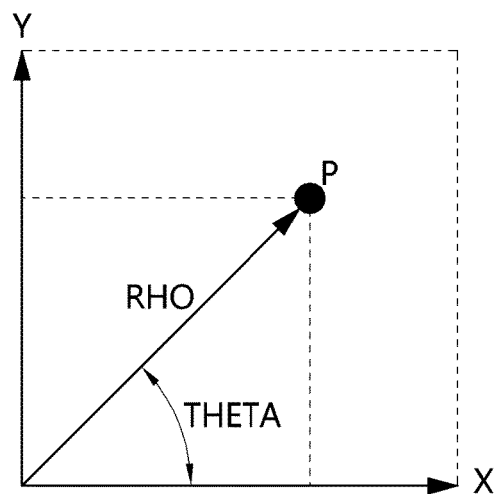
Figure 7:
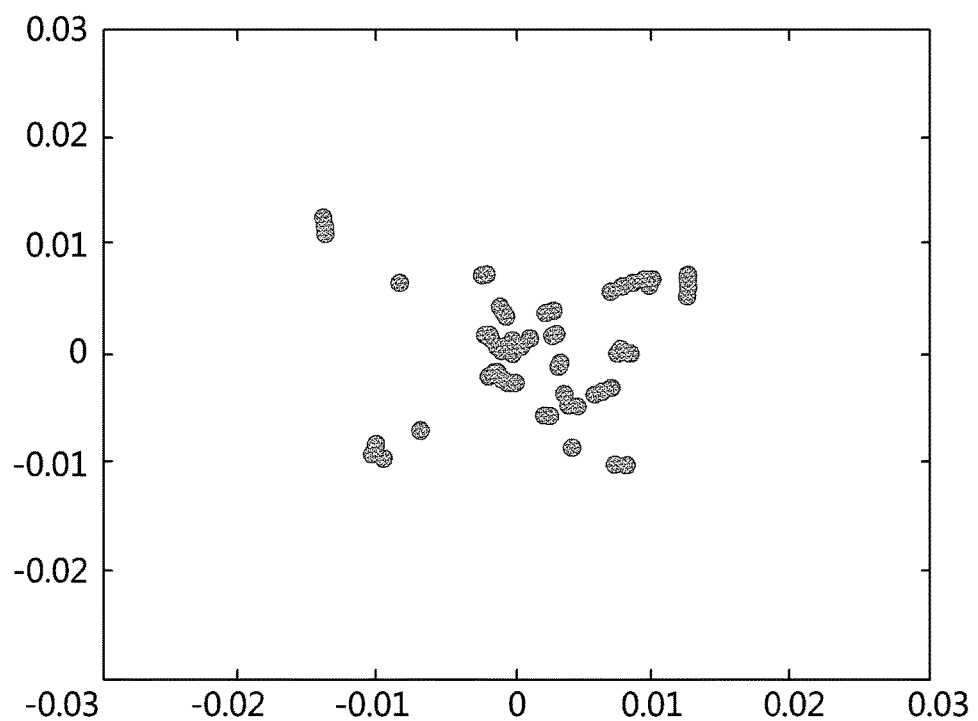

Here, the polar coordinate system illustrated in FIG. 5 may be converted into the orthogonal coordinate system by changing the coordinates to x and y values as shown in FIG. 6.

For example, an x-value of the point P illustrated in FIG. 6 may be rho*cos θ according to a trigonometric function, and a y-value of the point P may be rho*sin θ. Accordingly, all the rho values illustrated in FIG. 5 are changed to (x, y) coordinates, whereby the location coordinates shown in FIG. 7 may be acquired.

Figure 8:
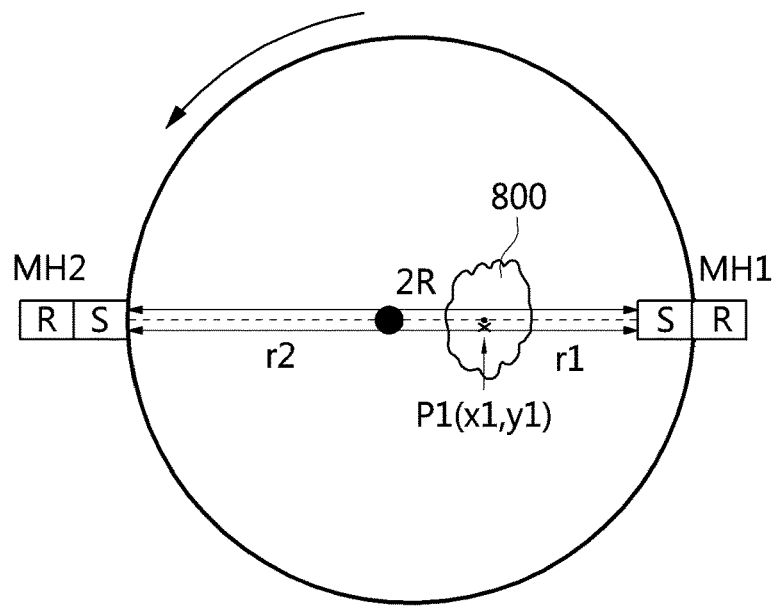
FIGS. 8 to 9 are views illustrating the process of calculating location coordinates according to an embodiment of the present invention.
Figure 9:
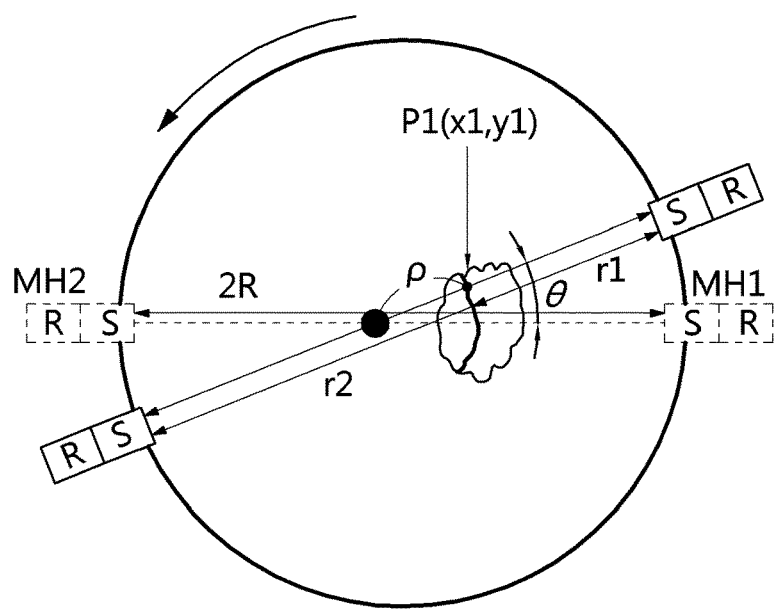

FIGS. 8 to 9 are views illustrating the process of calculating location coordinates according to an embodiment of the present invention.

Referring to FIGS. 8 and 9, in order to calculate location coordinates according to an embodiment of the present invention, it is necessary to calculate rho (ρ), which is the radius of the polar coordinates of the object to be measured.

To this end, it is necessary to calculate the distance between the object 800 to be measured and each of the two measurement heads.

Here, the circle illustrated in FIGS. 8 to 9 may correspond to a 2-dimensional circle that is generated as a result of the rotation of the measurement head fixing units, that is, the rotation of the two measurement heads. In this case, the center point of the circle illustrated in FIGS. 8 to 9 may correspond to the origin of the polar coordinates.

Here, MH1 and MH2 illustrated in FIGS. 8 to 9 may correspond to the first measurement head and the second measurement head, respectively. Also, a first distance from the first measurement head MH1 to the object 800 to be measured may be $r_1$, and a second distance from the second measurement head MH2 to the object 800 to be measured may be $r_2$.

Here, the location of the object between the two measurement heads may be determined to be the point P1, which is the center point of the object located on the straight line formed by the two measurement heads, and thereby the location of the object may be calculated.

Here, if the strength of excitation signals induced by the two measurement heads is S, and if a proportional constant for representing the difference in the strengths of signals that reach the signal detection modules included in the first measurement head and the second measurement head depending on the kind of signals applied by the first measurement head and the second measurement head is k, the strengths of the signals detected by MH1 and MH2 may be calculated as the following Equation (1):

$$H_{MH1} = k\frac{S}{r_1^2}$$
$$H_{MH2} = k\frac{S}{r_2^2}$$
(1)

Here, the diameter 2R of the circle illustrated in FIG. 8 may be the addition of $r_1$, which is the first distance, and $r_2$, which is the second distance.

Therefore, using Equation (1) and the diameter 2R of the circle, the first distance $r_1$ may be calculated as the following Equation (2):

$$r_1 = \frac{2R}{1+\sqrt{\frac{H_{MH2}}{H_{MH1}}}} 2R$$
(2)

Here, $r_2$ may be calculated by subtracting the first distance from the diameter 2R of the circle.

As described above, the first distance $r_1$ and the second distance $r_2$ are calculated, the first distance and the second distance are compared, and the radius rho (ρ) may be calculated by subtracting the radius R of the circle from the second distance, which is longer than the first distance. That is, $\rho = r_2 - R$. Here, the value corresponding to ρ may be equal to or greater than 0.

Then, the distance ρ and the angle θ of the polar coordinates of the point P1, which is the center point of the object to be measured, may be acquired using the radius of the polar coordinates and the angle through which the two measurement heads rotate.

Then, the polar coordinates of the point P1 are converted into Cartesian coordinates corresponding to the orthogonal coordinate system, whereby the location coordinates of the object to be measured according to the present invention may be acquired.

Here, the present invention may acquire the location coordinates of the object while rotating the two measurement heads counterclockwise, as shown in FIG. 9. In this case, if theta (θ) changes, the first distance $r_1$ and the second distance $r_2$ may change, and thus the signal strength at MH1 and the signal strength at MH2 may also change. Therefore, the value corresponding to rho (ρ) may be calculated depending on the signal strength at MH1 and the signal strength at MH2, which are measured when theta (θ) changes in the apparatus for acquiring the location coordinates.

In other words, the following function may be defined:
rho (ρ)=f ($H_{MH1}$, $H_{MH2}$)
$H_{MH1}$, $H_{MH2}$=f (M, theta)

Accordingly, theta (θ) is not used as a variable in order to directly calculate rho (ρ), but $H_{MH1}$ and $H_{MH2}$, changed by theta (θ), may be included in the equation for calculating rho (ρ). This may correspond to a method generally used in a Radon transform, which performs an operation for projection data.

Figure 10:
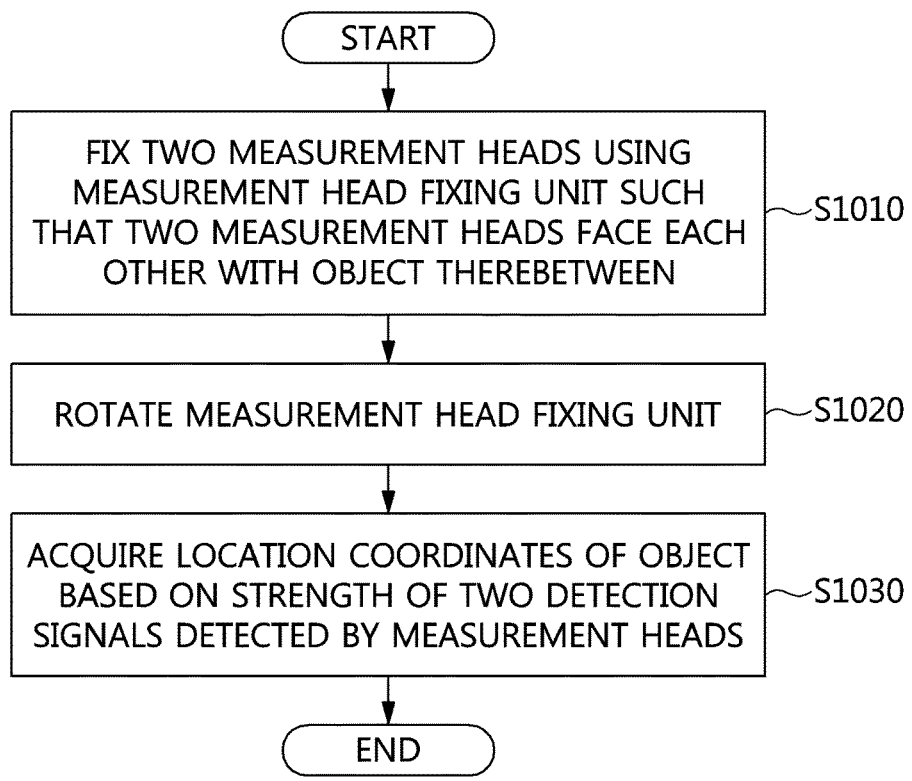
FIG. 10 is a flowchart of a method for acquiring location coordinates of an object to be measured using two measurement heads according to an embodiment of the present invention.

FIG. 10 is a flowchart of a method for acquiring location coordinates of an object to be measured using two measurement heads according to an embodiment of the present invention.

Referring to FIG. 10, in the method for acquiring the location coordinates of the object to be measured using the two measurement heads according to an embodiment of the present invention, the two measurement heads for detecting signals corresponding to the object to be measured are fixed using the measurement head fixing units such that the two measurement heads face each other with the object therebetween at step S1010.

Here, the two measurement heads may be fixed at locations opposite each other on the rotatable structure. Also, each of the two measurement heads may include a signal excitation module and a signal detection module.

Here, the location of the two measurement heads may be adjusted using the two measurement head fixing units in order for the signal excitation module and the signal detection module to be parallel to a straight line on which the two measurement heads are located. For example, the locations of the two measurement heads may be precisely controlled using tools such as a micrometer or the like.

Also, in the method for acquiring the location coordinates of the object to be measured using the two measurement heads according to an embodiment of the present invention, the measurement head fixing units are rotated at step S1020.

Here, as the rotatable structure to which the two measurement head fixing units are fixed rotates, the two measurement heads may rotate while the object to be measured is placed therebetween.

Therefore, when the measurement is made, the two measurement heads may continuously rotate and simultaneously generate and detect a signal while the object to be measured moves along the object motion path. Here, because a signal excitation module and a signal detection module are located together, the apparatus for measuring the location coordinates of an object to be measured may be simplified.

Also, in the method for acquiring the location coordinates of the object to be measured using the two measurement heads according to an embodiment of the present invention, the location coordinates of the object are acquired at step S1030 based on the strengths of the two detection signals detected by the measurement heads.

For example, the two measurement heads may generate magnetic fields having the same strength, and thereby may induce excitation signals on the object to be measured. Here, if the object is located at the center of the two measurement heads, the excitation signals induced by the two measurement heads have the same strength, but if not, the strengths of the excitation signals induced by the two measurement heads may differ from each other. In this case, because the strengths of the signals emitted from the object may also differ from each other, the location coordinates of the object may be acquired by measuring the difference in the signal strengths.

Here, a radius corresponding to the polar coordinates of the object may be calculated based on a circle generated by the rotation. In other words, the center of the circle generated by the rotation may correspond to the origin of the polar coordinates. Accordingly, the distance from the origin to the object may correspond to the radius of the polar coordinates.

Here, a first distance, which is a length from the object to be measured to the first measurement head, and a second distance, which is a length from the object to be measured to the second measurement head, are calculated, and the radius corresponding to the polar coordinates may be calculated by subtracting the radius of the circle from a longer distance among the first distance and the second distance.

For example, if the radius of a circle is 7 cm, the first distance is 10 cm, and the second distance is 4 cm, the radius corresponding to the polar coordinates may be 3 cm, which is calculated by subtracting 7 cm, which is the radius of the circle, from 10 cm.

Here, the first distance and the second distance may be calculated using at least one of the strength of a first detection signal detected by the first measurement head, the strength of a second detection signal detected by the second measurement head, and a proportional constant according to the type of the signal.

For example, if the first measurement head is MH1, the second measurement head is MH2, the first distance is $r_1$, the second distance is $r_2$, the strength of the excitation signals induced by the two measurement heads is S, the proportional constant is k, the strength of the first detection signal $H_{MH1}$ and the strength of the second detection signal $H_{MH2}$ may be calculated as the following Equation (1):

$$H_{MH1} = k\frac{S}{r_1^2} \quad (1)$$

$$H_{MH2} = k\frac{S}{r_2^2}$$

Here, the diameter 2R of the circle, which is generated by the rotation of the measurement head fixing units, may be $r_1+r_2$. Therefore, using Equation (1) and the diameter of the circle generated by the rotation of the measurement head fixing units, the first distance may be calculated using the following Equation (2):

$$r_1 = \frac{2R}{1+\sqrt{\frac{H_{MH2}}{H_{MH1}}}} 2R \quad (2)$$

Also, the second distance may be calculated by subtracting the first distance from the diameter 2R of the circle, which is generated by the rotation of the measurement head fixing units.

Here, the polar coordinates may be converted into Cartesian coordinates based on the radius corresponding to the polar coordinates and the angle through which the measurement head fixing units rotate.

For example, if the radius corresponding to the polar coordinates is r, and if the angle through which the measurement head fixing units rotate is θ, the location coordinates (x, y), when converted into Cartesian coordinates, may be (r*cos θ, r*sin θ).

Here, the location coordinates corresponding to the detection signals, which are detected while the two measurement heads rotate counterclockwise through 180 degrees, may be acquired. Specifically, when the first measurement head and the second measurement head respectively start from the top and bottom of the circle and rotate through 180 degrees, a circle may be generated as if they had rotated through 360 degrees. That is, a circle may be generated by the rotation of the measurement head fixing units, and location coordinates of every part of the object located inside the circle may be acquired.

Here, in order to detect a nonlinear magnetic particle, the two measurement heads may include a single excitation solenoid coil for generating a magnetic field based on a combined signal, in which a high-frequency sinusoidal signal is combined with a low-frequency sinusoidal signal.

Here, the magnetic field may be the sum of a first magnetic field, which is generated to correspond to the high-frequency sinusoidal signal, and a second magnetic field, which is generated to correspond to the low-frequency sinusoidal signal. In other words, because the combined signal is applied to a single excitation solenoid coil, a magnetic field that seems as if it were generated using two excitation solenoid coils may be acquired.

Here, the combined signal may be generated by adding the high-frequency sinusoidal signal and the low-frequency sinusoidal signal using a combiner.

Here, the combiner may be a passive electronic element, which produces a signal that is a composite of two signals by adding them. That is, as the two signals are simply added, they may be combined without interfering with each other.

Here, the combiner may be one of a Radio Frequency (RF) combiner and a summing amplifier, which correspond to the characteristics of the combined signal.

Here, the RF combiner is one kind of passive circuit, and may be a circuit for combining power of different signals or splitting power of signal equally or unevenly. Here, the RF combiner may combine two signals by performing signal addition, unlike a mixer, which mixes two signals having different frequencies and outputs a signal at a frequency equal to the difference between the two signals.

Here, the summing amplifier may be a circuit for performing only an addition operation, among the operations of an existing operational amplifier, which may perform addition, subtraction, or differentiation and integration of multiple signals.

In this case, whether to use the RF combiner or the summing amplifier as the combiner according to the present invention may be determined by a user or an administrator, who implements the present invention.

Also, the two measurement heads amplify the strength of the high-frequency sinusoidal signal and the strength of the low-frequency sinusoidal signal respectively using a first amplifier and a second amplifier and input the two signals to the combiner. Then, the strength of the signal output from the combiner is amplified using a third amplifier, whereby a combined signal may be generated.

Here, the first amplifier and the second amplifier may respectively amplify the high-frequency sinusoidal signal and the low-frequency sinusoidal signal by regulating the strength thereof depending on the characteristics of the combined signal. That is, because the two signals are amplified differently by varying the strength thereof, it is possible to realize an effect that can be acquired when two excitation solenoid coils are used and the characteristic of an input signal is controlled by adjusting the ratio of the number of turns of the two excitation solenoid coils and the geometrical location of the two coils.

Also, the third amplifier may regulate the strength of the signal in order to compensate for loss that occurs when the two signals are combined through the combiner, which is a passive electronic element. That is, the strength of the combined signal output from the combiner may be amplified so as to compensate for the strength lost in the combiner.

Here, the frequency domain of the signal emitted from the object to be measured is analyzed, and if a harmonic peak is found, it may be determined that a nonlinear magnetic particle exists on the object to be measured.

Here, the harmonic peak corresponds to a peak of a certain frequency, and may be found when a nonlinear magnetic particle exists on the object to be measured. Here, the characteristic of the corresponding particle may be understood based on the harmonic peak found in the frequency domain.

Here, if transformation of the signal at the sum of two frequencies is detected in the frequency domain, whether a harmonic peak is found may be checked. That is, if a nonlinear magnetic particle exists on the object, the signal emitted from the object may be detected as not being proportional to the signal at the sum of the two frequencies.

Therefore, if the signal is not proportional to the signal at the sum of the two frequencies but a transformed signal is detected, a nonlinear magnetic particle is expected to exist on the object, and thus the process of detecting the harmonic peak may be performed.

As described above, the 2-dimensional coordinates of an object to be measured may be acquired quickly at low cost using the method for acquiring the location coordinates of an object to be measured.

Also, the location of an object in 2-dimensional space may be detected using only the movement of the measurement heads, and the location of the object to be measured may be acquired based on the difference in the signal strengths, which depends on distance. Therefore, technology that can be widely used for devices from small display equipment to devices that require wide area information, such as radar, may be provided.

Figure 11:
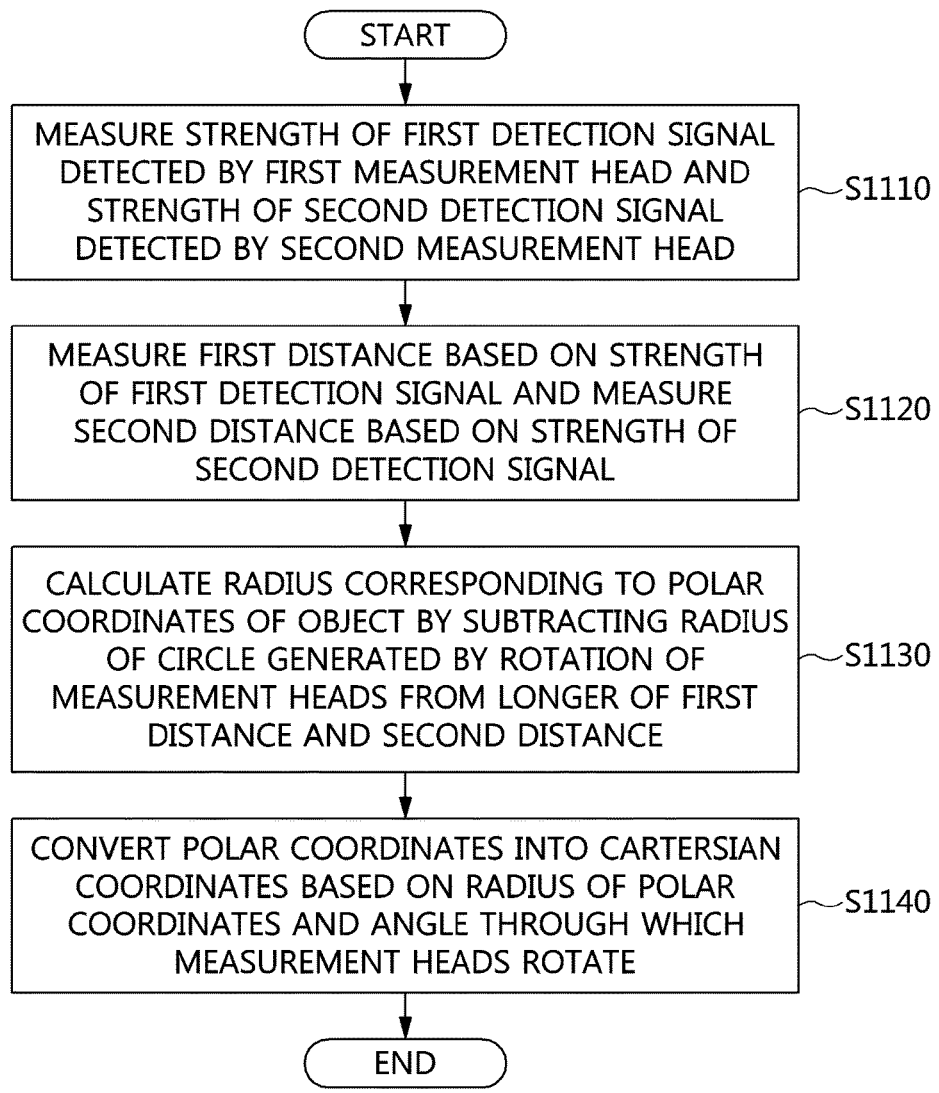
FIG. 11 is a flowchart of the process of acquiring location coordinates using detection signals in the method for acquiring location coordinates of an object to be measured using two measurement heads according to an embodiment of the present invention.

FIG. 11 is a flowchart of the process of acquiring location coordinates using detection signals in the method for acquiring location coordinates of an object to be measured using two measurement heads according to an embodiment of the present invention.

Referring to FIG. 11, in the process of acquiring location coordinates using detection signals in the method for acquiring location coordinates of an object to be measured using two measurement heads according to an embodiment of the present invention, the strength of the first detection signal detected by the first measurement head and the strength of the second signal detected by the second measurement head may be measured at step S1110.

Here, the first measurement head and the second measurement head generate magnetic fields having the same strength, and thereby may induce excitation signals on the object to be measured. Here, if the object to be measured is located at the center of the first measurement head and the second measurement head, the excitation signals induced by the two measurement heads have the same strength, but if not, the strengths of the excitation signals induced by the two measurement heads may differ from each other. In this case, because the strengths of the signals emitted from the object may also differ from each other, the strengths of the detection signals detected by the measurement heads may be measured separately.

Then, a first distance may be measured based on the strength of the first detection signal, and a second distance may be measured based on the strength of the second detection signal at step S1120.

In other words, the strength of the first detection signal is compared with the strength of the second detection signal, and the first distance and the second distance may be measured based on the inverse relationship to signal strength.

Then, the radius corresponding to the polar coordinates of the object to be measured may be calculated at step S1130 by subtracting the radius of the circle generated by the rotation of the measurement heads from the longer of the first distance and the second distance.

Here, the radius of the polar coordinates may be the distance from the origin of the polar coordinates to the object to be measured.

Then, the polar coordinates may be converted into Cartesian coordinates at step S1140 based on the radius of the polar coordinates and the angle through which the measurement heads rotate.

For example, if the radius corresponding to the polar coordinates is r, and if the angle through which the measurement head fixing units rotate is $\theta$, the location coordinates, converted into Cartesian coordinates, may be ($r*\cos \theta$, $r*\sin \theta$).

According to the present invention, 2-dimensional coordinates of an object to be measured may be quickly acquired at low cost.

Also, the present invention may detect the location of an object in 2-dimensional space using only the movement of measurement heads.

Also, because the present invention may acquire the location of an object to be measured using only a difference in signal strength depending on distance, it is possible to provide technology that may be widely used for devices from small display equipment to devices that require wide area information, such as radar.

As described above, the apparatus for acquiring the location coordinates of an object to be measured using two measurement heads and the method using the apparatus according to the present invention are not limitedly applied to the configurations and operations of the above-described embodiments, but all or some of the embodiments may be selectively combined and configured, so that the embodiments may be modified in various ways.

What is claimed is:

1. An apparatus for acquiring location coordinates of an object to be measured using two measurement heads, comprising:
    two measurement heads, each of the measurement heads being configured to detect a signal corresponding to the object to be measured; and
    a rotatable structure to which the two measurement heads are attached,
    wherein the apparatus is configured to:
    acquire the location coordinates of the object to be measured based on strengths of two detection signals detected by the measurement heads by calculating a radius corresponding to polar coordinates of the object to be measured based on a circle of the rotation;
    acquire the location coordinates by converting the polar coordinates into Cartesian coordinates based on the radius corresponding to the polar coordinates and an angle by which the measurement head fixing unit rotates;
    calculate a first distance, which is a length between the object to be measured and a first measurement head, and a second distance, which is a length between the object to be measured and a second measurement head; and
    calculate the radius corresponding to the polar coordinates by subtracting the radius of the circle from a longer distance of the first distance and the second distance,
    wherein the two measurement heads face each other, and the object is located between the two measurement heads.

2. The apparatus of claim 1, wherein the apparatus calculates the first distance and the second distance using at least one of a strength of a first detection signal detected by the first measurement head, a strength of a second detection signal detected by the second measurement head, and a proportional constant according to a kind of the signal.

3. The apparatus of claim 1, wherein the apparatus acquires the location coordinates to correspond to the detection signals detected while the measurement heads rotate counterclockwise 180 degrees.

4. The apparatus of claim 1, wherein the two measurement heads include a single excitation solenoid coil for generating a magnetic field based on a combined signal in which a high-frequency sinusoidal signal is combined with a low-frequency sinusoidal signal in order to detect a nonlinear magnetic particle.

5. The apparatus of claim 4, wherein the magnetic field corresponds to an addition of a first magnetic field, which is generated to correspond to the high-frequency sinusoidal signal, and a second magnetic field, which is generated to correspond to the low-frequency sinusoidal signal.

6. The apparatus of claim 4, wherein the combined signal is generated by combining the high-frequency sinusoidal signal with the low-frequency sinusoidal signal using a combiner in which two signals are combined by being added.

7. A method for acquiring location coordinates of an object to be measured using two measurement heads, comprising:
    fixing two measurement heads, which individually detect a signal corresponding to an object to be measured, wherein the two measurement heads face each other, and the object is located between the two measurement heads;
    rotating the measurement heads; and
    acquiring the location coordinates of the object to be measured based on strengths of two detection signals detected by the measurement heads by:
    calculating a radius corresponding to polar coordinates of the object to be measured based on a circle generated by the rotation; and
    converting the polar coordinates into Cartesian coordinates based on the radius corresponding to the polar coordinates and an angle by which the measurement heads rotate,
    wherein calculating the radius includes calculating a first distance, which is a length between the object to be measured and a first measurement head, and a second distance, which is a length between the object to be measured and a second measurement head, and calculating the radius corresponding to the polar coordinates by subtracting the radius of the circle from a longer distance of the first distance and the second distance.

8. The method of claim 7, wherein calculating the radius includes calculating the first distance and the second distance using at least one of a strength of a first detection signal detected by the first measurement head, a strength of a second detection signal detected by the second measurement head, and a proportional constant according to a kind of the signal.

9. The method of claim 7, wherein the location coordinates correspond to the detection signals detected while the measurement heads rotate counterclockwise 180 degrees.

10. The method of claim 7, wherein the two measurement heads include a single excitation solenoid coil for generating a magnetic field based on a combined signal in which a high-frequency sinusoidal signal is combined with a low-frequency sinusoidal signal in order to detect a nonlinear magnetic particle.

11. The method of claim 10, wherein the magnetic field corresponds to an addition of a first magnetic field, which is generated to correspond to the high-frequency sinusoidal signal, and a second magnetic field, which is generated to correspond to the low-frequency sinusoidal signal.

12. The method of claim 10, wherein the combined signal is generated by combining the high-frequency sinusoidal signal with the low-frequency sinusoidal signal using a combiner in which two signals are combined by being added.

* * * * *